United States Patent [19]
Braun et al.

[11] Patent Number: 6,161,578
[45] Date of Patent: *Dec. 19, 2000

[54] LOW SPILL HIGH FLOW QUICK COUPLING VALVE ASSEMBLY

[75] Inventors: Thomas Anthony Braun, Minneapolis; Brian J. Blenkush, Maple Grove, both of Minn.

[73] Assignee: Colder Products Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/227,419

[22] Filed: Jan. 8, 1999

Related U.S. Application Data

[63] Continuation-in-part of application No. 08/728,403, Oct. 9, 1996, Pat. No. 6,024,124.

[51] Int. Cl.$^7$ .................................................. F16L 29/00
[52] U.S. Cl. ................................. 137/614.03; 137/614.04
[58] Field of Search ........................... 137/614.03, 614.04

[56] References Cited

U.S. PATENT DOCUMENTS

| D. 314,233 | 1/1991 | Medvick . |
| D. 315,400 | 3/1991 | Medvick . |
| D. 347,467 | 5/1994 | Medvick . |

(List continued on next page.)

FOREIGN PATENT DOCUMENTS

| 41 01 001 A1 | 7/1991 | Germany . |
| 2 175 968 | 12/1986 | United Kingdom . |
| 2 231 632 | 11/1990 | United Kingdom . |

OTHER PUBLICATIONS

"Aeroquip/Hydraulic couplings, FD49 Series", *Aeroquip product brochure*, 2 pages (date unknown)

"CPC Quick Couplings for Plastic Tubing", *Colder Products Company product brochure*, Form CP–1, Rev 2 990, 36 pages (1990). .

"Free Flow Couplings", *Colder Products Company product brochure*, Form MPC–2 1092, 2 pages (1992).

"General Program", product brochure by Stäubli SA, Mar. 1990, 16 pages (1990).

"HFC–35 Series Couplings", *Colder Products Company product brochure*, Form HFC–2 294, 4 pages (1994).

"High Flow Coupling", *Colder Products Company product brochure*, Form HFC–2 1292, 4 pages (1992).

"High Flow Coupling", *Colder Products Company product brochure*, Form HFC–1, 1292, 4 pages (1992).

"MPC Series Couplings—Biological and body fluid tubing connections just got easier", *Colder Products Company product brochure*, Form MPC–1 494, 8 pages (1994).

"Non–Spill Couplings", *Quick Coupling Division, Parker Fluid Connectors*, 2 pages (date unknown).

(List continued on next page.)

*Primary Examiner*—John Fox
*Attorney, Agent, or Firm*—Merchant & Gould P.C.

[57] ABSTRACT

A high flow low spill quick coupling valve assembly is used to connect to pressurized, large diameter fluid lines. The valve assembly includes a female coupling and a male coupling, each of which defines a fluid passageway. The female coupling fluid passageway is normally closed by a female coupling valve. The female coupling valve is normally biased into a close position by a female coupling spring which is isolated from the female coupling fluid passageway. The male coupling fluid passageway is normally closed by a male coupling valve. The male coupling valve is normally biased into a close position by a male coupling spring which is isolated from the male coupling fluid passageway. Both male and female coupling valves are fluid pressure balanced to minimize the connecting force and opening force. The male coupling is inserted into the female coupling and is engaged with the female coupling to open the fluid passageways. A vent conduit vents the internal air pressure between inside and outside of the coupling valve assembly. The fluid spillage or leakage is minimized. The male coupling further includes an insert seat which forms an internal groove. All spring members in the valve assembly are isolated from contact with the fluid media.

11 Claims, 12 Drawing Sheets

U.S. PATENT DOCUMENTS

| | | |
|---|---|---|
| 2,545,796 | 3/1951 | Scheiwer . |
| 2,837,352 | 6/1958 | Wurzburger . |
| 2,859,932 | 11/1958 | Mackal . |
| 3,075,270 | 1/1963 | Elsner . |
| 3,097,865 | 7/1963 | Zeeb et al. . |
| 3,106,420 | 10/1963 | Elsner . |
| 3,123,099 | 3/1964 | Breuning et al. . |
| 3,125,359 | 3/1964 | Charles . |
| 3,203,665 | 8/1965 | Grant et al. . |
| 3,215,161 | 11/1965 | Goodwin et al. . |
| 3,219,278 | 11/1965 | Santarelli . |
| 3,401,956 | 9/1968 | McCracken . |
| 3,464,436 | 9/1969 | Bruning . |
| 3,525,361 | 8/1970 | Cerbin et al. . |
| 3,537,152 | 11/1970 | Fournier . |
| 3,584,835 | 6/1971 | White et al. . |
| 3,618,781 | 11/1971 | Brown . |
| 3,666,300 | 5/1972 | Russell . |
| 3,685,397 | 8/1972 | Gooding, Jr. . |
| 3,707,878 | 1/1973 | Treichler . |
| 3,818,939 | 6/1974 | Buseth . |
| 4,114,853 | 9/1978 | Medvick . |
| 4,182,380 | 1/1980 | Palau . |
| 4,183,498 | 1/1980 | Hajek, II et al. . |
| 4,221,235 | 9/1980 | Maldaus . |
| 4,222,411 | 9/1980 | Herzan et al. . |
| 4,269,226 | 5/1981 | Allread . |
| 4,296,914 | 10/1981 | Allread . |
| 4,378,028 | 3/1983 | Weber et al. . |
| 4,436,125 | 3/1984 | Blenkush . |
| 4,442,863 | 4/1984 | Magorien . |
| 4,501,407 | 2/1985 | Murray . |
| 4,540,021 | 9/1985 | Rogers . |
| 4,541,457 | 9/1985 | Blenkush . |
| 4,549,440 | 10/1985 | Fournier et al. . |
| 4,549,575 | 10/1985 | Rogers . |
| 4,596,272 | 6/1986 | Medvick et al. . |
| 4,613,112 | 9/1986 | Phlipot et al. . |
| 4,637,432 | 1/1987 | Medvick et al. . |
| 4,665,943 | 5/1987 | Medvick et al. . |
| 4,671,540 | 6/1987 | Medvick et al. . |
| 4,674,535 | 6/1987 | de Menibus . |
| 4,685,490 | 8/1987 | Medvick et al. . |
| 4,703,957 | 11/1987 | Blenkush . |
| 4,733,692 | 3/1988 | Kotake et al. . |
| 4,763,683 | 8/1988 | Carmack . |
| 4,786,223 | 11/1988 | Crissy et al. . |
| 4,792,162 | 12/1988 | Medvick . |
| 4,828,296 | 5/1989 | Medvick . |
| 4,884,830 | 12/1989 | Meisinger . |
| 4,909,477 | 3/1990 | Heiman . |
| 4,921,282 | 5/1990 | Meisinger . |
| 4,924,909 | 5/1990 | Wilcox . |
| 4,934,655 | 6/1990 | Blenkush et al. . |
| 4,944,977 | 7/1990 | Shantz et al. . |
| 4,982,761 | 1/1991 | Kreczko et al. . |
| 5,033,777 | 7/1991 | Blenkush . |
| 5,052,725 | 10/1991 | Meyer et al. . |
| 5,076,325 | 12/1991 | Ekman . |
| 5,080,133 | 1/1992 | Johnson et al. . |
| 5,090,747 | 2/1992 | Kotake . |
| 5,104,158 | 4/1992 | Meyer et al. . |
| 5,123,446 | 6/1992 | Haunhurst et al. . |
| 5,123,677 | 6/1992 | Kreczko et al. . |
| 5,143,347 | 9/1992 | Lee et al. . |
| 5,179,976 | 1/1993 | Boland et al. . |
| 5,316,041 | 5/1994 | Ramacier, Jr. et al. . |
| 5,330,235 | 7/1994 | Wagner et al. . |
| 5,343,798 | 9/1994 | Meisinger et al. . |
| 5,353,836 | 10/1994 | deCler et al. . |

OTHER PUBLICATIONS

"PTFE gedichtete Schnellkupplung—Serie 'QT'", *German SWAGELOK catalog*, 3 pages (date unknown).

"Quick Couplings and Fittings for Plastic Tubing", *Colder Products Company catalog*, Form CP–2 rev 2 195, 48 pages (1995).

"Quik–Facts HFC–12 Series Polypropylene High Flow Coupling", *Colder Products Company product brochure*, Form QF–4 1194, 2 pages (1994).

"Quik–Facts HFC–35 Series Polysulfone High Flow Coupling", *Colder Products Company product brochure*, Form QF–5 0294, 2 pages (1994).

"Quick–Release Couplings Series for all Fluids", *Product brochure by Stäubli Corporation*, 32 pages, (date unknown).

Series 23 Flush Valve Quick–Disconnect Couplings, *Snap—Tite, Inc.*, 23C–Jul. 1975, 2 pages (1975).

"Softtube™ fittings", *Colder Products Company product brochure*, Form St–1, Rev. 2–691, 4 pages (1991).

"Softtube® fittings", *Colder Products Company product brochure*, Form ST–1, 1993, 4 pages (1993).

LOW SPILL HIGH FLOW QUICK COUPLING VALVE ASSEMBLY

This application is a CIP of Ser. No. 08/728,403 filed Oct. 9, 1996 now U.S. Pat. No. 6,024,124.

FIELD OF THE INVENTION

The present invention relates to a quick coupling valve assembly, more particularly, to a low spill high flow quick coupling valve assembly.

BACKGROUND OF THE INVENTION

Generally, the invention relates to coupling valve assemblies of the quick connect type.

Various types of quick coupling valve assemblies are known and disclosed in the art, such as a quick connection coupling valve assembly disclosed in the U.S. Pat. No. 5,316,041, issued to Patrick J. Ramacier, Jr. and David W. Meyer. The conventional coupling valve assemblies are generally used in low internal fluid pressure, small diameter fluid lines. The internal fluid pressure is applied to a full cross-section valve members of the coupling valve assembly. For example, the '041 patent discloses a valve assembly which includes a poppet valve member in each of the female and male couplings. The internal fluid pressure is applied to a full cross-section both female and male of the poppet valve members. To engage/disengage the male coupling with/from the female coupling, a large connection force is required to overcome the internal fluid pressure.

In high internal pressure, large diameter fluid lines, it requires an extremely large connection force to overcome the high internal fluid pressure. The present invention solves this problem by minimizing the cross-sectional area of the valve members on which the fluid flow acts. Accordingly, the valve members, of male and female couplings, are substantially pressure balanced so that the acting force is dramatically reduced.

In addition, spring members which are utilized in the conventional coupling assemblies are exposed to fluid passageways. The present invention encloses spring members so that the spring members are not exposed to fluid passageways.

In addition, in the fluid dispensing industry, there are other concerns, such as the cost of the coupling valve assembly. The present invention minimizes the cost by providing a coupling valve assembly made from a minimal number of parts.

There is also a need for coupling valve assemblies which can be reused with a variety of connections. The present invention provides a non-disposable coupling valve assembly which can be utilized with a variety of fluid conduit adaptors.

The present invention provides a coupling valve assembly which solves these and other problems associated with existing coupling valve assemblies.

SUMMARY OF THE INVENTION

The present invention relates to a quick coupling valve assembly, more particularly, to a low spill high flow quick coupling valve assembly.

In one embodiment, a coupling valve assembly generally in accordance with the present invention comprises:

a female coupling including:

a female coupling outer body having a front end and a back end;

a female coupling inner body, having a front end and a back end, being retained in the female coupling outer body;

a female coupling slide valve being reciprocally received between the female coupling outer body and the female coupling inner body for reciprocal movement along a longitudinal axis of the coupling valve assembly;

a female coupling spring being disposed between the female coupling inner and outer bodies, the female coupling slide valve being normally biased toward the front end of the outer body by the female coupling spring;

the female coupling inner body defining a female coupling fluid passageway therethrough, the female coupling inner body including a fluid port in a circumferential wall of the female coupling inner body proximate the front end of the female coupling inner body, the female coupling slide valve and the female coupling inner body forming a fluid tight seal sealing off the fluid port when the female coupling slide valve is biased to the front end of the female coupling, whereby the female coupling slide valve normally closes the fluid port so that the female coupling is normally closed and prohibits fluid flow therethrough, the female coupling spring being isolated from the female coupling fluid passageway;

a male coupling, including:

a male coupling outer body having a front end and a back end;

a male coupling inner body, having a front end a back end, being retained in the male coupling outer body;

a male coupling slide valve, having a front end portion and a back end portion, being reciprocally received in the male coupling inner body for reciprocal movement along the longitudinal axis of the coupling valve assembly;

a male coupling spring being disposed inside the male coupling slide valve between the front end portion of the male coupling slide valve and the back end of the male coupling inner body, the male coupling slide valve being normally biased toward the front end of the male coupling outer body by the male coupling spring;

a male coupling insert seat retaining the male coupling slide valve in the male coupling outer body;

a male coupling fluid passageway being defined between the male coupling outer body and the male coupling inner body, the front end portion of the male coupling slide valve and the front end of the male coupling outer body forming a fluid tight seal when the male coupling slide valve is normally biased to the front end of the male coupling, whereby the male coupling slide valve normally engages with the front end of the male coupling outer body so that the male coupling is normally closed, the male coupling spring being isolated from the male coupling fluid passageway;

a clip assembly being disposed proximate the front end of the female coupling for releasably locking the male coupling in the female coupling, so that the female coupling fluid passageway is in fluid communication with the male coupling fluid passageway; and a vent conduit passing through the male coupling inner body and the male coupling outer body to vent pressure between inside of the coupling valve assembly and outside of the coupling valve assembly so that pressure between inside and outside of the coupling valve assembly is equalized.

Further in one embodiment, a pressure balancing feature is built in the valve assembly in both half sides of the coupling valve assembly. In particular, the internal fluid pressure only applies onto a small cross-section of the valve members so that the connecting force is dramatically reduced. The separating force is also dramatically reduced. In addition, it prevents the risk where the male coupling member flies out of the female coupling member. One advantage of having the pressure balance features is that it allows for the use of an inexpensive lightweight, transversely mounted, molded plastic clip assembly.

Still in one embodiment, the female and male coupling springs are not exposed to the female and male coupling fluid passageways. The internal air pressure in the coupling valve assembly resulting from the reciprocal movement of the male and female coupling slide valves is equalized to the external pressure outside the coupling valve assembly. Thus, the male coupling can be easily inserted and locked in the female coupling.

Further in one embodiment, upon locking the male coupling into the female coupling, the female coupling inner body and male coupling slide valve engage one another and the female coupling slide valve and the male coupling outer body engage one another. Accordingly, the female coupling slide valve is pushed away from the fluid port of the female coupling inner body, and the male coupling slide valve is pushed away from the front end of the male coupling outer body. The male and female coupling passageways are thus open and in fluid communication with each other.

Still in one embodiment, the front end portion of the male coupling slide valve has a recessed portion for receiving the front end of the female coupling inner body. A fluid sealing member is disposed on an outer circumferential surface of the female coupling inner body proximate the front end of the female coupling inner body. When the male coupling is engaged with the female coupling at a pre-locking position, the fluid sealing member forms a fluid tight seal between the front end of the female coupling inner body and the inner side walls of the recessed portion. The fluid passageways are shut off when the male and female couplings are engaged the pre-locking position. Therefore, fluid spillage is minimized between the coupling male member and the coupling female member.

Yet in one embodiment, the clip assembly includes a clip member being transversely disposed relative to the female coupling, and a spring member being disposed between a top portion of the clip member and an outer surface of the female coupling outer body, a bottom portion of the clip member being normally disposed inside the female coupling outer body and being biased toward outside the female coupling outer body. The front end of the male coupling outer body is tapered inwardly, so that when the front end of the male coupling is inserted into the female coupling, the bottom portion of the clip member is biased to outside the female coupling outer body. Further, the bottom portion of the clip member is biased to outside the female coupling outer body when the female coupling and the male coupling are engaged in the pre-locking position.

Further in one embodiment, a female coupling fluid conduit adaptor is mounted onto the back end of the female coupling outer body for conducting fluid therethrough, and a male coupling fluid conduit adaptor is mounted onto the back end of the male coupling outer body for conducting fluid therethrough.

Still in one embodiment, the female coupling fluid conduit adaptor and the male coupling fluid conduit adaptor are detachably, threadedly mounted in the female coupling outer body and male coupling outer body, respectively. The adaptors are configured in such a manner as to fit in both male and female bodies. Accordingly, the fluid conduit adaptors can be replaceable according to different sizes of fluid line connections. By having such a replacement feature, the coupling valve assembly can be readily adapted to or reused with different types of fluid line connections.

Yet in one embodiment, the back end of the male coupling inner body has a conical shape, so that fluid smoothly flows between the male coupling fluid passageway and the male coupling fluid conduit adaptor.

Further in one embodiment, the fluid sealing member is an O-ring or a quad-ring. In one embodiment, the quad-ring is lubricated.

Still in one embodiment, the male coupling insert seat also allows to include an internal quad ring groove in the design as a molded feature. This groove must otherwise be machined requiring a costly second operation. More importantly, when leaving a thick section as would be required for machining of the groove in a molded plastic part, there often forms shrinks and porosity in the form of air pockets just below the surface. These pockets would then be exposed when machining the groove and thus a leakage path would be created. One embodiment of the present invention overcome this costly and potentially catastrophic shortcoming with the use of the seat insert.

In one embodiment, a coupling valve assembly comprises:

a female coupling defining a female coupling fluid passageway, the female coupling member including a female coupling valve which is normally biased into a closed position by a female coupling spring so as to close the female coupling fluid passageway, the female coupling valve including a female coupling slide valve and a female coupling inner body, the female coupling slide valve being disposed in the female coupling for reciprocal movement along a longitudinal axis of the coupling valve assembly, the female coupling spring being isolated from the female coupling fluid passageway;

a male coupling defining a male coupling fluid passageway, the male coupling including a male coupling valve which is normally biased into a closed position by a male coupling spring so as to close the male coupling fluid passageway, the male coupling valve including a male coupling slide valve, a male coupling outer body, and a male coupling inner body, the male coupling slide valve being disposed in the male coupling for reciprocal movement along the longitudinal axis of the coupling valve assembly, the male coupling spring being isolated from the male coupling fluid passageway;

the female coupling inner body engaging with the male coupling slide valve and the male coupling outer body engaging with the female coupling slide valve so as to open the fluid passageways;

a clip assembly having a locking member to lock the male coupling in the female coupling and having an unlocking member to unlock the male coupling from the female coupling wherein the fluid passageways are closed; and a vent conduit passing through the male coupling inner body and the male coupling outer body to vent air pressure between inside of the coupling valve assembly and outside of the coupling valve assembly so that the air pressure between the inside and outside of the coupling valve assembly is equalized.

A coupling valve assembly comprises:

a female coupling defining a female coupling fluid passageway, the female coupling member including a female coupling valve which is normally biased into a closed position by a female coupling spring so as to close the female coupling fluid passageway, the female coupling valve including a female coupling slide valve and a female coupling inner body, the female coupling slide valve being disposed in the female coupling for reciprocal movement along a longitudinal axis of the coupling valve assembly, the female coupling spring being isolated from the female coupling fluid passageway;

a male coupling defining a male coupling fluid passageway, the male coupling including a male coupling valve which is normally biased into a closed position by a male coupling spring so as to close the male coupling fluid passageway, the male coupling valve including a male coupling slide valve, a male coupling outer body, and a male coupling inner body, the male coupling slide valve being disposed in the male coupling for reciprocal movement along the longitudinal axis of the coupling valve assembly, the male coupling spring being isolated from the male coupling fluid passageway;

the female coupling inner body engaging with the male coupling slide valve and the male coupling outer body engaging with the female coupling slide valve so as to open the fluid passageways;

a clip assembly having a locking member to lock the male coupling in the female coupling and having an unlocking member to unlock the male coupling from the female coupling wherein the fluid passageways are closed;

a vent conduit passing through the male coupling inner body and the male coupling outer body to vent air pressure between inside of the coupling valve assembly and outside of the coupling valve assembly so that the air pressure between the inside and outside of the coupling valve assembly is equalized; and fluid pressure balance means for reducing fluid pressurized area on the male and female coupling slide valves.

Still in one embodiment, the fluid pressure balance means includes a first sealing member (134) which seals between the male coupling inner body and the male coupling slide valve, a second sealing member (116) which seals between the female coupling inner body and the female coupling slide valve, a third sealing member (126) which seals between the female coupling slide valve and the male coupling outer body, a fourth sealing member (138) which seals between the female coupling inner body and the female coupling slide valve, and a fifth sealing member (114) which seals between the female coupling inner body and the male coupling side valve.

Further in one embodiment, a coupling valve assembly, comprises:

a female coupling including a first movable piston, wherein in an uncoupled state, the first movable piston is sealed by a first seal (138) having a first sealing diameter (d1) and a second seal (116) having a second sealing diameter (d2) which is smaller than the first sealing diameter, an internal pressure exerts a force on a first annular area (A1) of the first movable piston which is defined between the first and second sealing diameters;

a male coupling including a second movable piston, wherein in an uncoupled state, the second movable piston is sealed by a third seal (126) having a third sealing diameter (d3) and a fourth seal (134) having a fourth sealing diameter (d4) which is smaller than the third sealing diameter, an internal pressure exerts a force on a second annular area (A2) of the second movable piston which is defined between the third and fourth sealing diameters, and wherein the first sealing diameter is the same as the third sealing diameter, the second sealing diameter is the same as the fourth sealing diameter; and wherein when the female and male couplings are coupled in a coupled state, the first movable piston is sealed by the first seal (138) and the third seal (126) such that the first movable piston is pressure balanced under an internal fluid pressure, and the second movable piston is sealed by a fifth seal (114) and the fourth seal (134) such that the second movable piston is pressure balanced under the internal fluid pressure. The fifth seal (114) has the second sealing diameter (d2).

Yet in one embodiment, the sealing members are either an O-ring or a quad-ring.

In one embodiment, a coupling valve assembly, comprising:

a female coupling defining a female coupling fluid passageway therethrough, the female coupling including a female valve which is normally biased into a closed position by a female coupling spring so as to close the female coupling fluid passageway, the female coupling spring being isolated from the female coupling fluid passageway;

a male coupling defining a male coupling fluid passageway therethrough, the male coupling including a male valve which is normally biased into a closed position by a male coupling spring so as to close the male coupling fluid passageway, the male coupling spring being isolated from the male coupling fluid passageway;

means for locking the male coupling in the female coupling so as to open the fluid passageways;

means for unlocking the male and female couplings so as to close the fluid passageways; and vent means for equalizing internal air pressure of the coupling valve assembly with external air pressure outside the coupling valve assembly.

Still in one embodiment, the coupling valve assembly further comprises means for sealing the male and female couplings at a pre-locking position, whereby the fluid passageways are closed. Therefore, fluid spillage is minimized after unlocking.

One method for connecting/disconnecting a coupling valve assembly, comprises the steps of:

providing a female coupling defining a female coupling fluid passageway, the female coupling including a female valve which is normally biased into a closed position by a female coupling spring so as to close the female passageway, the female coupling spring being isolated from the female coupling fluid passageway;

providing a male coupling defining a male coupling fluid passageway, the male coupling including a male valve which is normally biased into a closed position by a male coupling spring so as to close the male passageway, the male coupling spring being isolated from the male coupling fluid passageway;

inserting the male coupling into the female coupling;

engaging the male coupling with the female coupling into a pre-locking position wherein the fluid passageways are closed;

locking the male and female couplings in a locking position wherein the fluid passageways are open;

venting internal air pressure inside of the valve assembly to the outside of the valve assembly;

unlocking the male and female couplings by pressing a clip assembly, the male and female couplings being returned to the pre-locking position upon being unlocked, the fluid passageways being closed, whereby fluid spillage upon unlocking is minimized; and separating the male coupling from the female coupling.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters generally indicate corresponding parts throughout the following several views.

DETAILED DESCRIPTION OF THE PREFERRED EMBODIMENT

Figure 1:
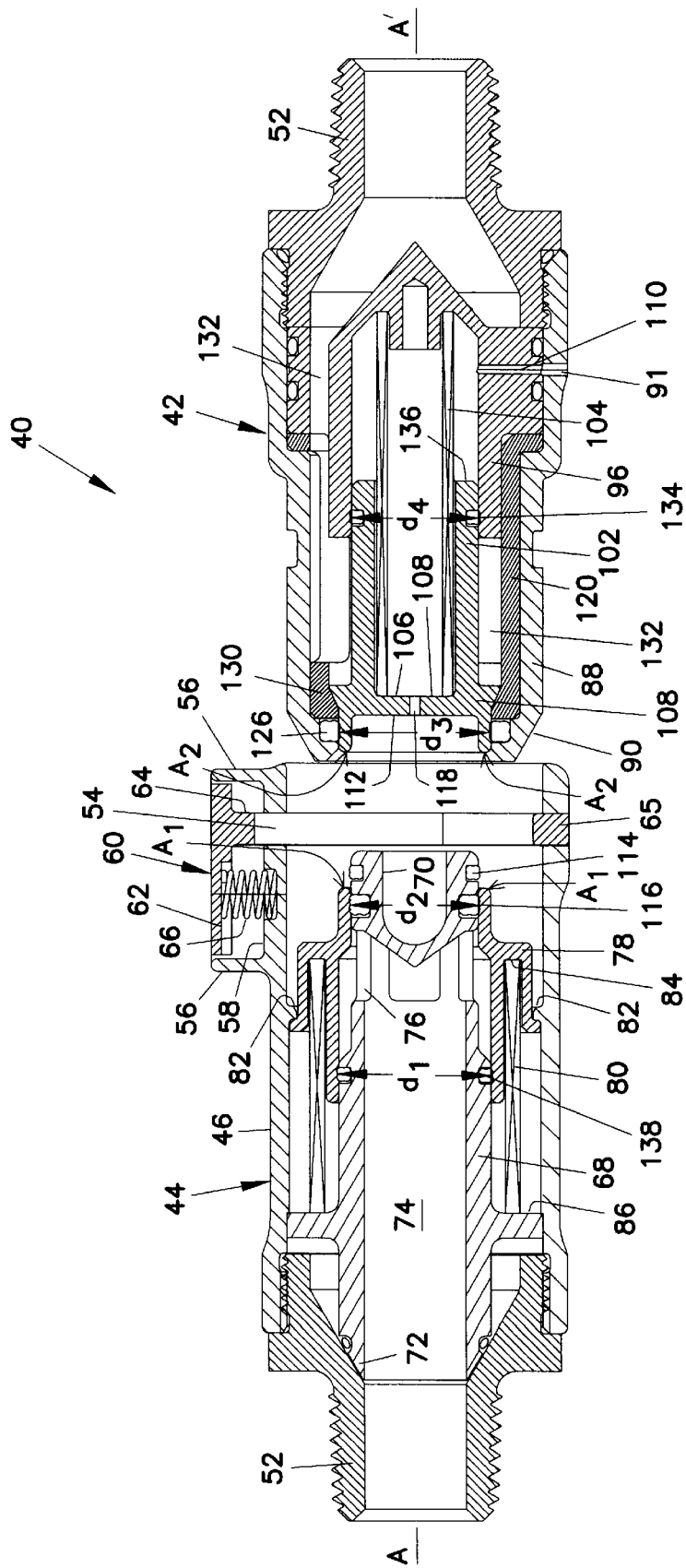
FIG. 1 is a longitudinal cross-sectional view of an embodiment of a coupling valve assembly in accordance with the principles of the present invention, wherein a male coupling is separated from a female coupling.
Figure 2:
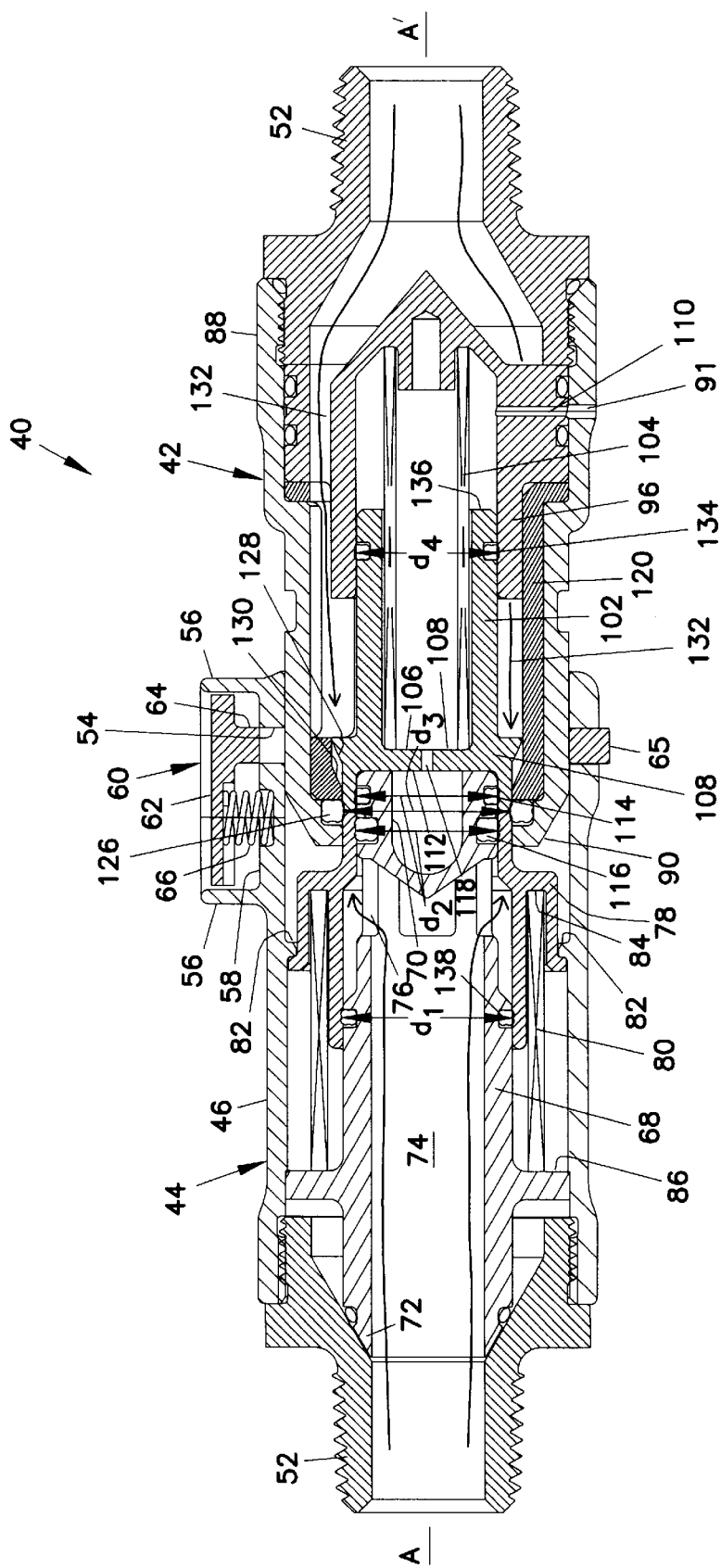
FIG. 2 is a longitudinal cross-sectional view of the coupling valve assembly, wherein the male coupling is engaged with the female coupling in a pre-locking position.
Figure 3:
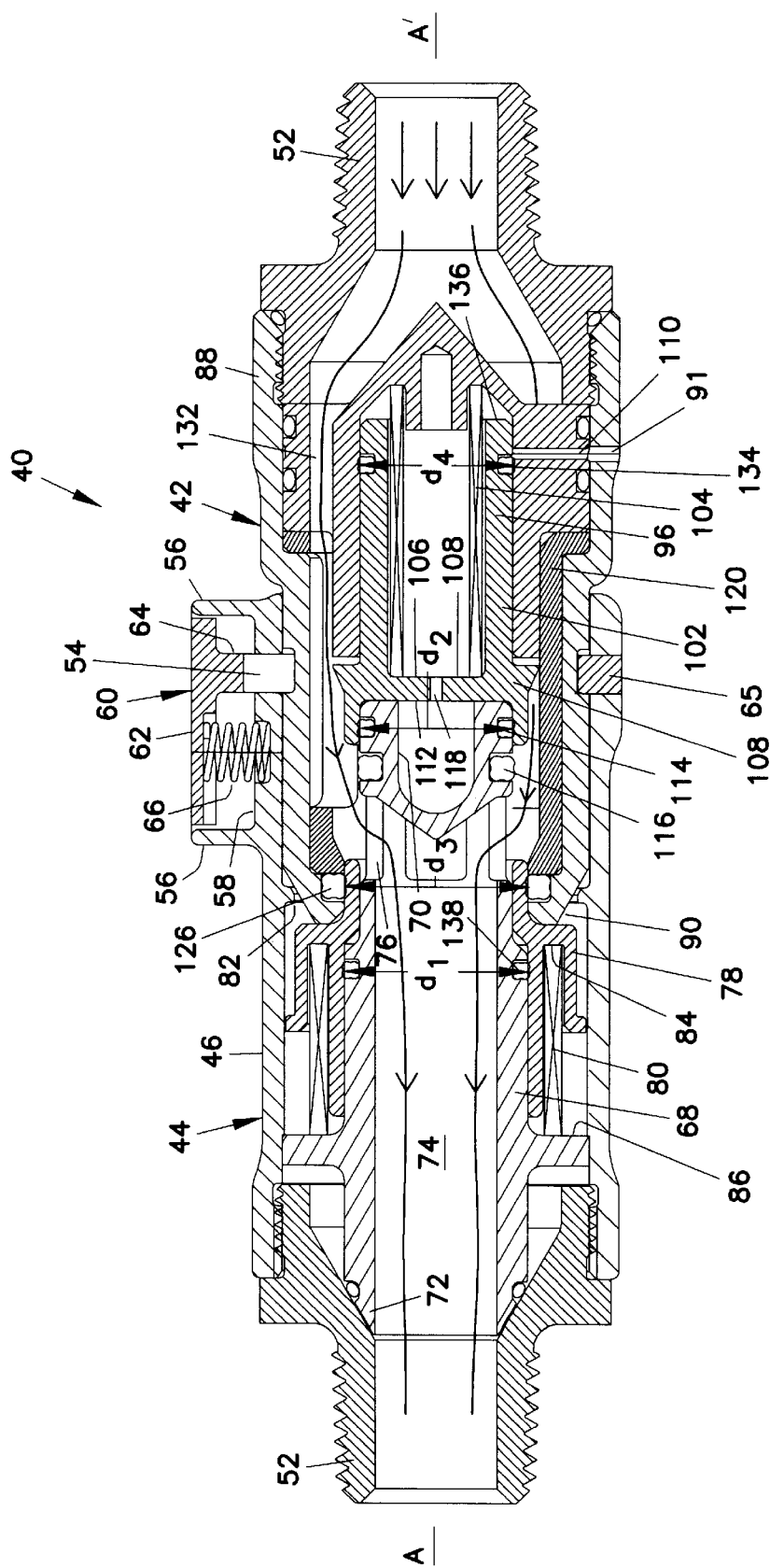
FIG. 3 is a longitudinal cross-sectional view of the coupling valve assembly, wherein the male coupling is engaged with the female coupling in a locking position.
Figure 4:
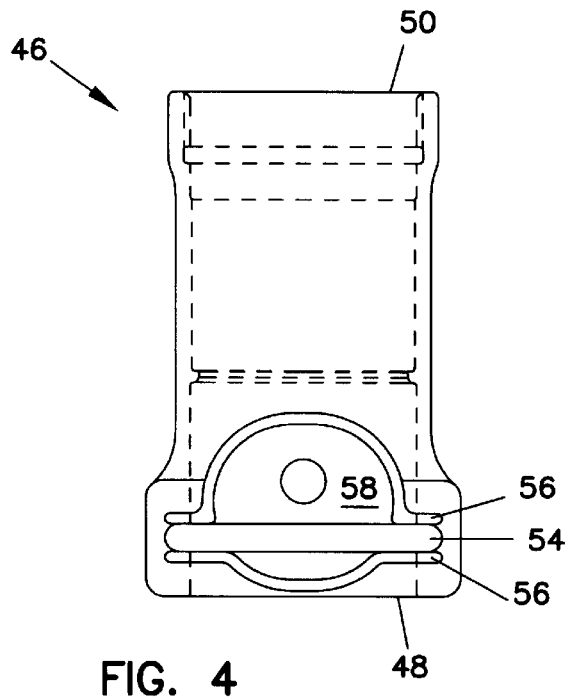
FIG. 4 is a top plane view of an outer body of the female coupling.
Figure 5:
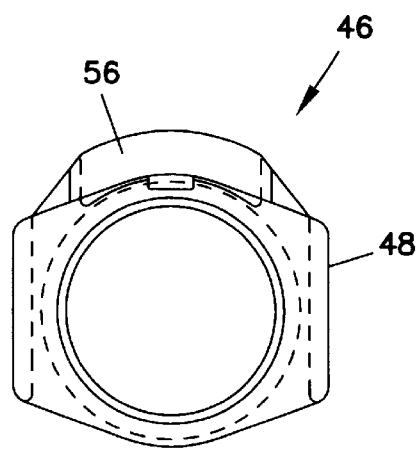
FIG. 5 is a front end view of the outer body of the female coupling.
Figure 6:
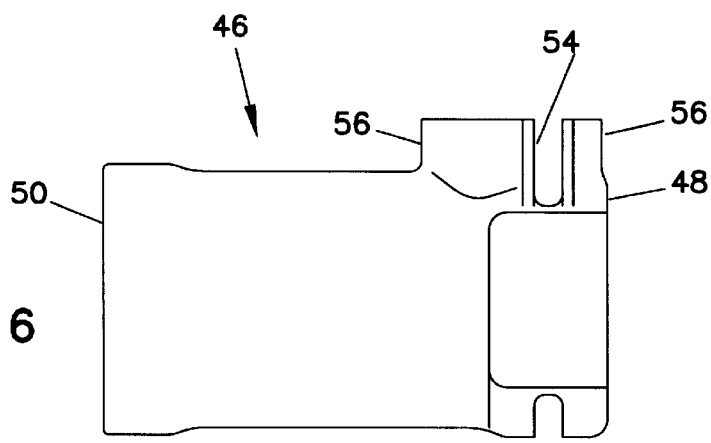
FIG. 6 is a side view of the outer body of the female coupling.
Figure 7:
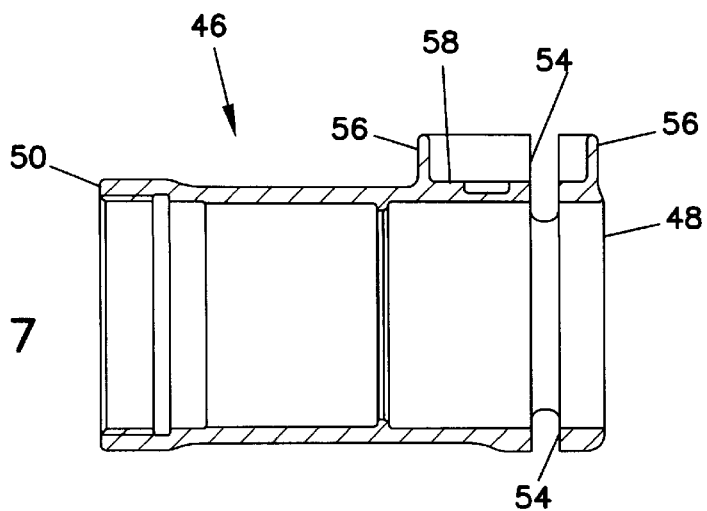
FIG. 7 is a longitudinal cross-sectional view of the outer body of the female coupling.

Referring now to the drawings in details, wherein like numerals identify similar elements throughout, FIGS. 1 to 3 show an embodiment of a coupling valve assembly 40, generally in accordance with the principles of the invention, being disposed in a separating position, a pre-locking position, and a locking position, respectively.

The coupling valve assembly 40 includes a male coupling 42 and a female coupling 44. The male coupling 42 is disengaged from the female coupling 44 in the separating position as shown in FIG. 1. The male coupling 42 is inserted in the female coupling 44 in the pre-locking position as shown in FIG. 2 and in the locking position as shown in FIG. 3.

For purposes of explanation, the parts used in the female coupling will include the designator "female coupling", such as female coupling spring, etc. The part used in the male coupling will include the designator "male coupling" such as male coupling spring, etc.

Figure 30:
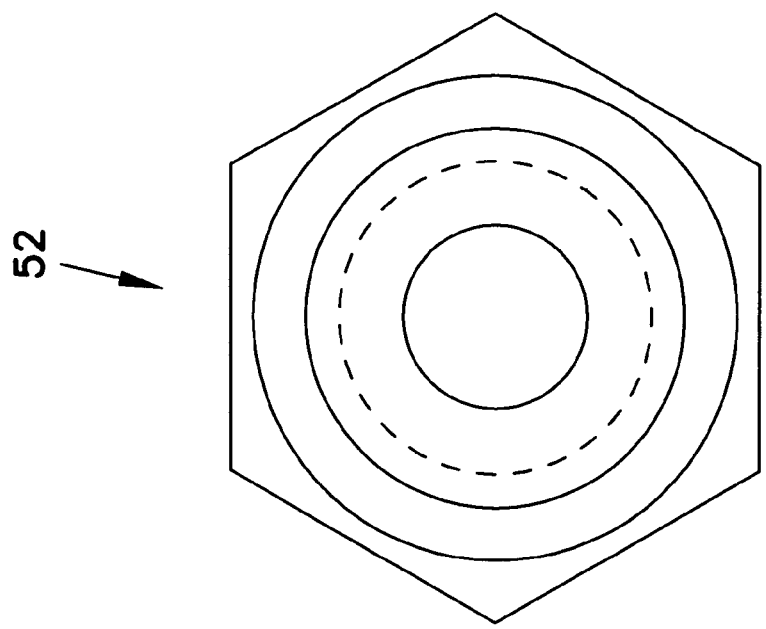
FIG. 30 is a front view of the fluid conduit adaptor.
Figure 29:
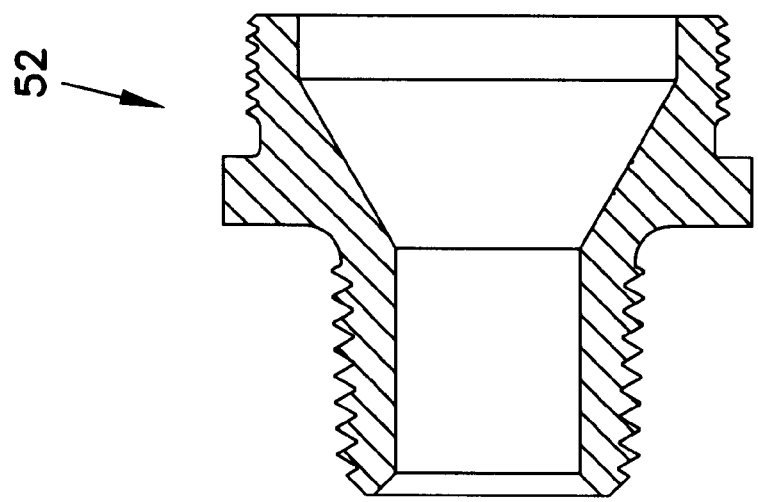
FIG. 29 is a longitudinal cross-sectional view of a fluid conduit adaptor attached to both the male and female couplings.

As shown in FIGS. 1–3, the female coupling 44 includes an outer body 46 which is shown in FIGS. 4–7 in details. The outer body 46 has a tubular shape and has an front end 48 and a back end 50. The front end 48 receives the male coupling 42. The back end 50 receives a fluid conduit adaptor 52 (see FIGS. 29–30).

The fluid conduit adaptor 52 is detachably mounted on the back end 50. It is appreciated that the fluid conduit adaptor 52 can be attached to the back end 50 by other means such as molding, or mounting by mounting devices, etc. Accordingly, the fluid conduit adaptor 52 is replaceable according to different sizes of fluid line connections (not shown). Thus, the coupling valve assembly 40 can be reused with a variety of connections. The fluid conduit connector 52 can be used with both the female and male couplings to minimize the parts.

Further in FIGS. 4–7, a slot 54 transversely passes through the outer body 46 proximate the front end 48 of the female coupling 44. A circumferential wall 56 is disposed around the slot 54 and forms a recessed portion 58 between the slot 54 and the wall 56.

Figure 23:
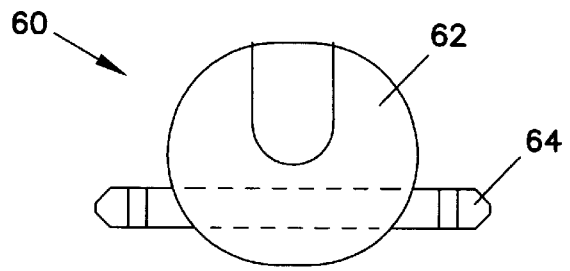
FIG. 23 is a top plane view of a clip assembly.
Figure 24:
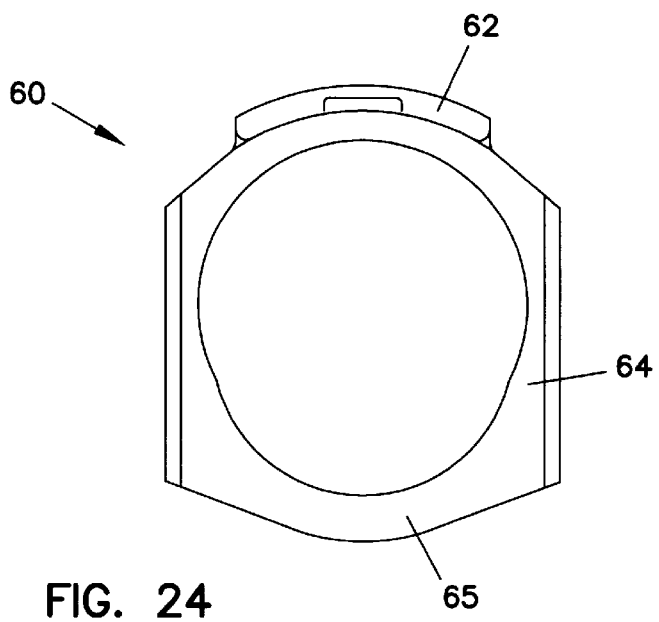
FIG. 24 is a front end view of the clip assembly.
Figure 25:
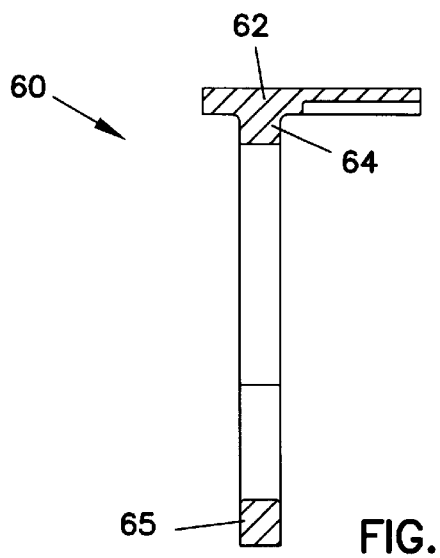
FIG. 25 is a longitudinal cross-sectional view of the clip assembly.

As shown in FIGS. 1–3, a clip assembly 60 passes through the slot 54. The clip assembly 60 is shown in FIGS. 23–25 in detail. The clip assembly 60 includes a top horizontal tab portion 62 and a vertical circular portion 64. The vertical circular portion 64 is molded with the top horizontal tab portion 62. The vertical circular portion 64 is disposed in the slot 54. A spring 66 is disposed between the recessed portion 58 and the top horizontal tab portion 62. Accordingly, the clip assembly 60 is reciprocally movable in the slot 54. In addition, the clip assembly 60 is normally biased toward the top of the female coupling 44, and a bottom part 65 of the vertical circular portion 64 is biased to the inside of the outer body 46. The bottom part 65 of the vertical circular portion 64 is pushed out of the outer body 46 by pressing the clip assembly 60 downwardly.

Figure 8:
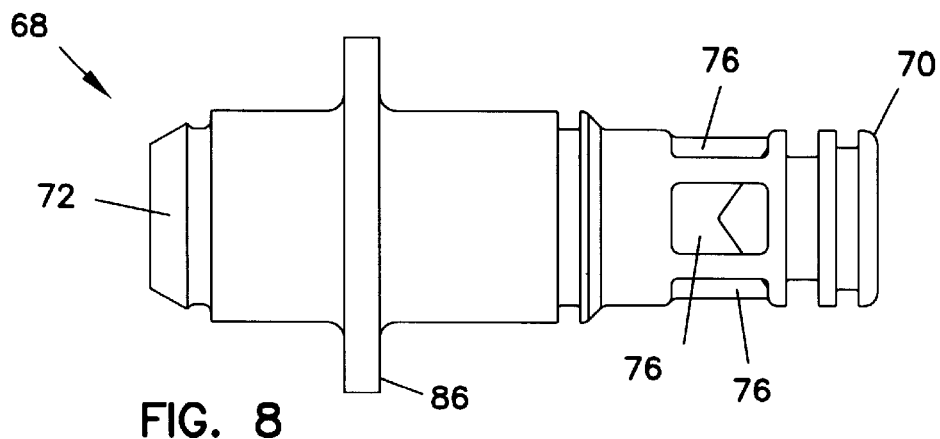
FIG. 8 is a side view of an inner body of the female coupling.
Figure 9:
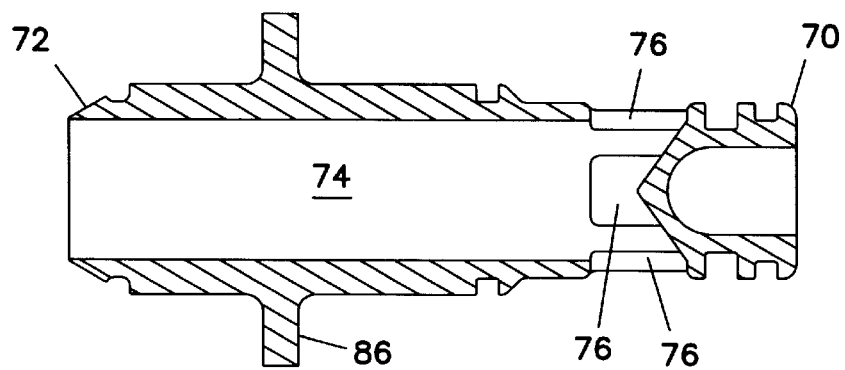
FIG. 9 is a longitudinal cross-sectional view of the inner body of the female coupling.
Figure 10:
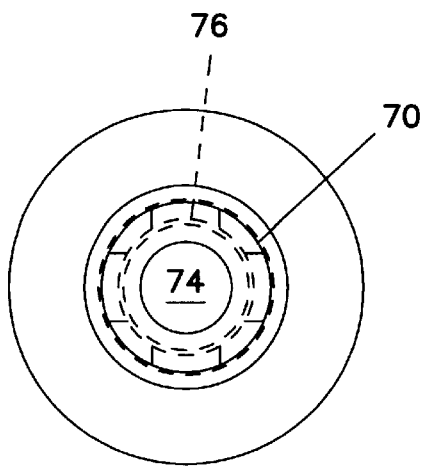
FIG. 10 is a front end view of the inner body of the female coupling.

Further in FIGS. 1–3, the female coupling 44 includes an inner body 68. The inner body 68 is retained in the outer body 46. The inner body 68 is shown in detail in FIGS. 8–10. The inner body 68 has a front end 70 and a back end 72. A fluid passageway 74 passes through the inner body 68 between the back end 72 and a fluid port 76 in a circumferential wall of the female coupling inner body 68 proximate the front end 70.

Figure 19:
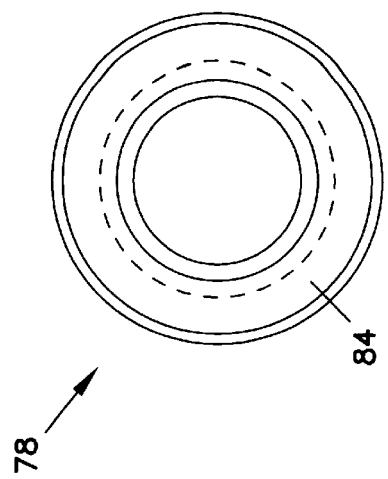
FIG. 19 is a back end view of the female coupling slide valve of the female coupling.
Figure 18:
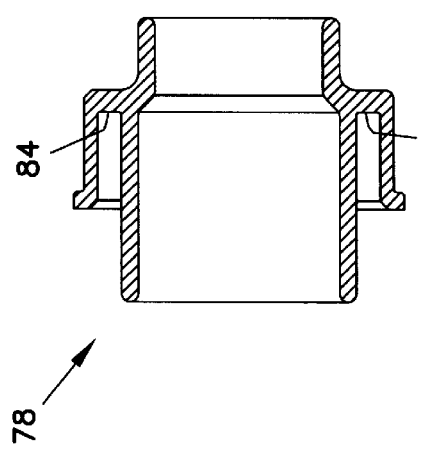
FIG. 18 is a longitudinal cross-sectional view of the female coupling slide valve of the female coupling.
Figure 17:
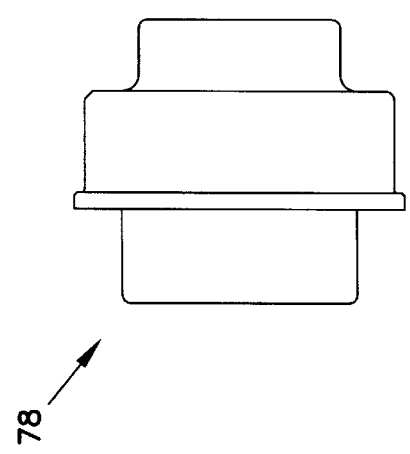
FIG. 17 is a side view of a female coupling slide valve of the female coupling.

Still in FIGS. 1–3, the female coupling 44 includes a slide valve 78 and a spring 80. The slide valve 78 is reciprocally received between the outer body 46 and the inner body 68 for reciprocal movement along a longitudinal axis A-A' of the coupling valve assembly 40. The slide valve 78 is normally biased toward the front end 48 of the outer body 46 by the spring 80. A projection 82 stops the forward movement of the slide valve 78. FIGS. 17–19 show the slide valve 78 in detail. The spring 80 is disposed between a back side 84 of the slide valve 80 and a transverse flange 86 of the inner body 68 which is disposed outside the inner body 68. Accordingly, the spring 80 is not exposed to the fluid passageway 74.

The slide valve 78 is normally biased to the front end 70 of the inner body 68 by the spring 80. The fluid port 76 is shut off by the slide valve 78, so that the fluid passageway 74 is closed at the front end 48 of the female coupling 44. When the slide valve 78 is pushed backward and away from the front end 70 and the fluid port 76, the fluid passageway 74 is open.

Figures 11, 13:
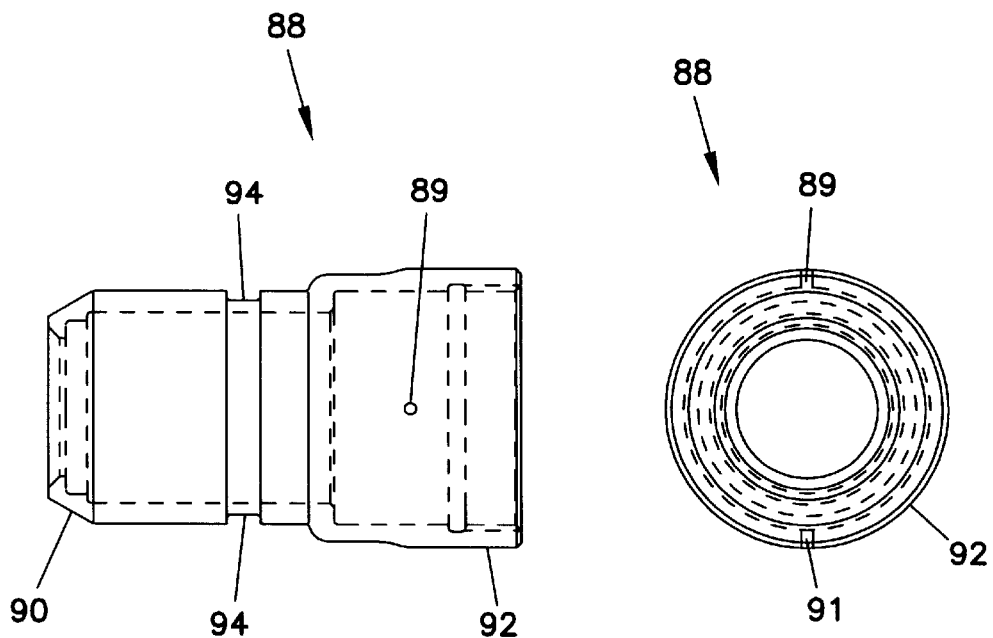
FIG. 11 is a side view of an outer body of the male coupling.
FIG. 13 is a back end view of the outer body of the male coupling.
Figure 12:
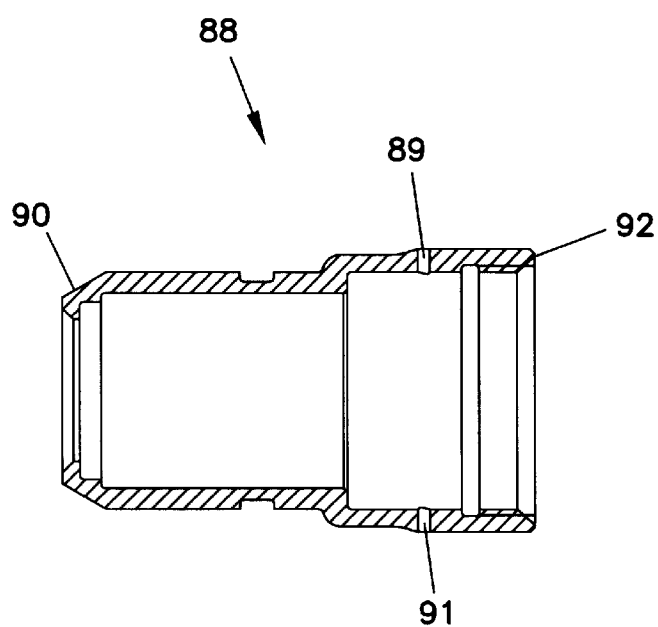
FIG. 12 is a longitudinal cross-sectional view of the outer body of the male coupling.

In FIGS. 1–3, the male coupling 42 includes an outer body 88. The outer body 88 is shown in FIGS. 11–13 in detail. The outer body 88 has a tubular shape. The outer body 88 has a tapered front end 90 and a back end 92. The back end 92 also receives the fluid conduit adaptor 52 as described above. A circumferential recessed portion 94 is disposed proximate the middle of the outer body 88. The circumferential recessed portion 94 receives and engages with the bottom part 65 of the vertical circular portion 64. Accordingly, the male coupling 42 is locked in the female coupling 44, as shown in FIG. 2.

Further as shown in FIGS. 11–13, the male coupling outer body 88 has venting holes 89, 91.

Figure 14:
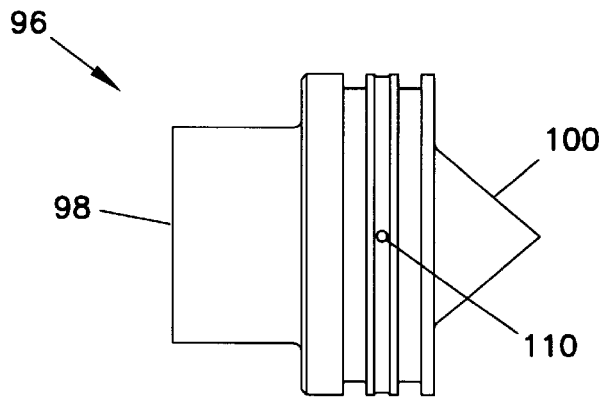
FIG. 14 is a side view of an inner body of the male coupling.
Figure 15:
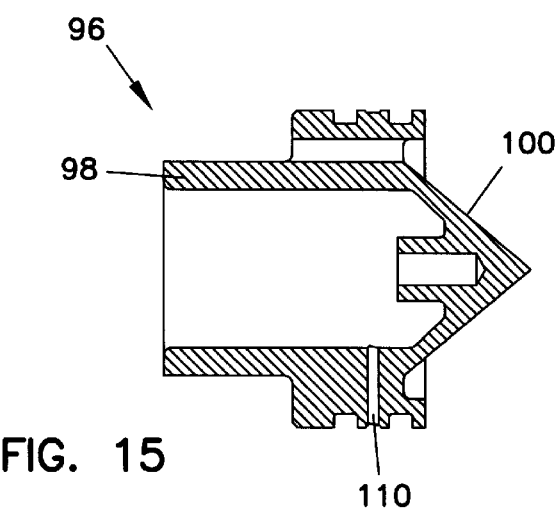
FIG. 15 is a longitudinal cross-sectional view of the inner body of the male coupling.
Figure 16:
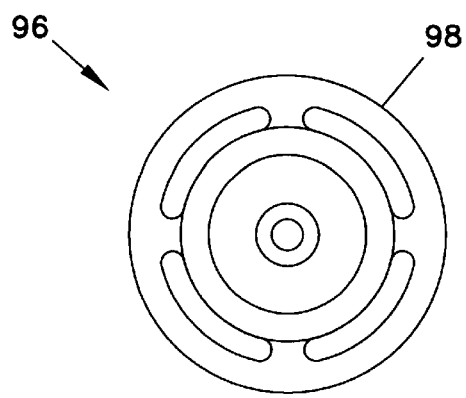
FIG. 16 is a front end view of the inner body of the male coupling.

Back to FIGS. 1–3, the male coupling 42 includes an inner body 96. The inner body 96 is retained in the outer body 88. The inner body 96 is shown in FIGS. 14–16 in detail. The inner body 96 has a front end 98 and a back end 100. The back end 100 has a conical shape. The male coupling 42 further includes a slide valve 102 and a spring 104. The slide valve 102 is biased toward the front end 90 of the male coupling 42 by the spring 104. Thus, the slide valve 102 is reciprocally received in the inner body 96 for reciprocal movement along the longitudinal axis A-A' of the valve assembly 40. The spring 104 is disposed between a back side 106 of the slide valve 102 and the back end 100 of the inner body 96. Accordingly, a front end portion 108 of the slide valve 102 biasedly projects out of the inner body 96 to the front end 90 of the male coupling 42.

Further in FIGS. 14–16, the inner body 96 includes a vent conduit 110. The vent conduit 110 vertically passes through the body of the inner body 96. The vent conduit 110 is in communication with the venting holes 89, 91 on the outer body 88 (see FIGS. 1–3). Accordingly, the back side of the slide valve in the male coupling is vented and thus is equalized to the pressure outside of the coupling valve assembly 40. Therefore, this pressure equalization makes it easier to couple the male and female coupling halves when the slide valve 102 is biasedly pushed toward back end 92 of the male coupling 42.

Further, and much more significantly, a pressure balance is achieved in each coupling half and between the two halves when coupled. This is accomplished by the significant reduction of effective area upon which the fluid pressure acts to create a force which opposes the coupling action. The valve assembly connection force is dramatically reduced. Accordingly, the applied force required to couple the coupling halves and thus the force acting on the clip assembly which locks the two coupling halves is substantially reduced. The clip assembly 60 can thus be made of a lightweight, plastic material.

Figure 22:
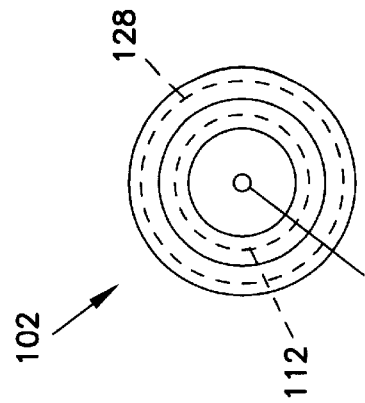
FIG. 22 is a back end view of the male coupling slide valve of the male coupling.
Figure 21:
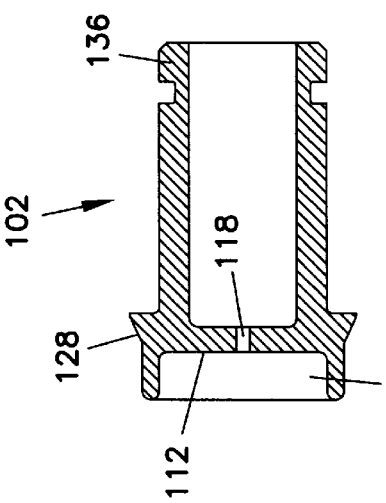
FIG. 21 is a longitudinal cross-sectional view of the male coupling slide valve of the male coupling.
Figure 20:
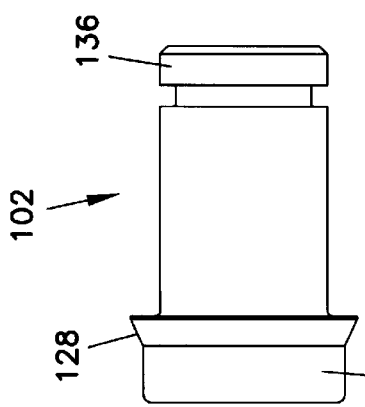
FIG. 20 is a side view of a male coupling slide valve of the male coupling.

The slide valve 102 is shown in FIGS. 20–22 in detail. A recessed portion 112 is disposed at the front end portion 108 of the slide valve 102. The front end 70 of the female coupling inner body 68 is received in the recessed portion 112 (see FIGS. 2–3). A fluid sealing member 114, which is retained in the outer wall of the inner body 68 proximate the front end 70, seals the gap between the inner wall of the recessed portion 112 and the outer wall of the inner body 68. Thus, the fluid is stopped from moving into the recessed portion 112. As shown in FIGS. 1–3, the male coupling spring 104 is not exposed to the fluid passageway 132. A fluid sealing member 134 is retained in the outer wall of the male coupling slide valve 102 proximate a back end portion 136 thereof. The fluid sealing member 134 seals the gap between the outer wall of the male coupling slide valve 102 and the inner wall of the male coupling inner body 96. Thus, no fluid can flow into the inner body 96 of the male coupling 42. As a result, the male coupling slide valve 102 is pressure balanced in the internal fluid flow. In addition, a fluid sealing member 116 is retained in the outer wall of the inner body 68 proximate the front end 70 behind the fluid sealing member 114. The fluid sealing member 116 seals the gap between the outer wall of the inner body 68 and the inner wall of the female coupling slide valve 78 (see FIGS. 2–3).

Figure 31:
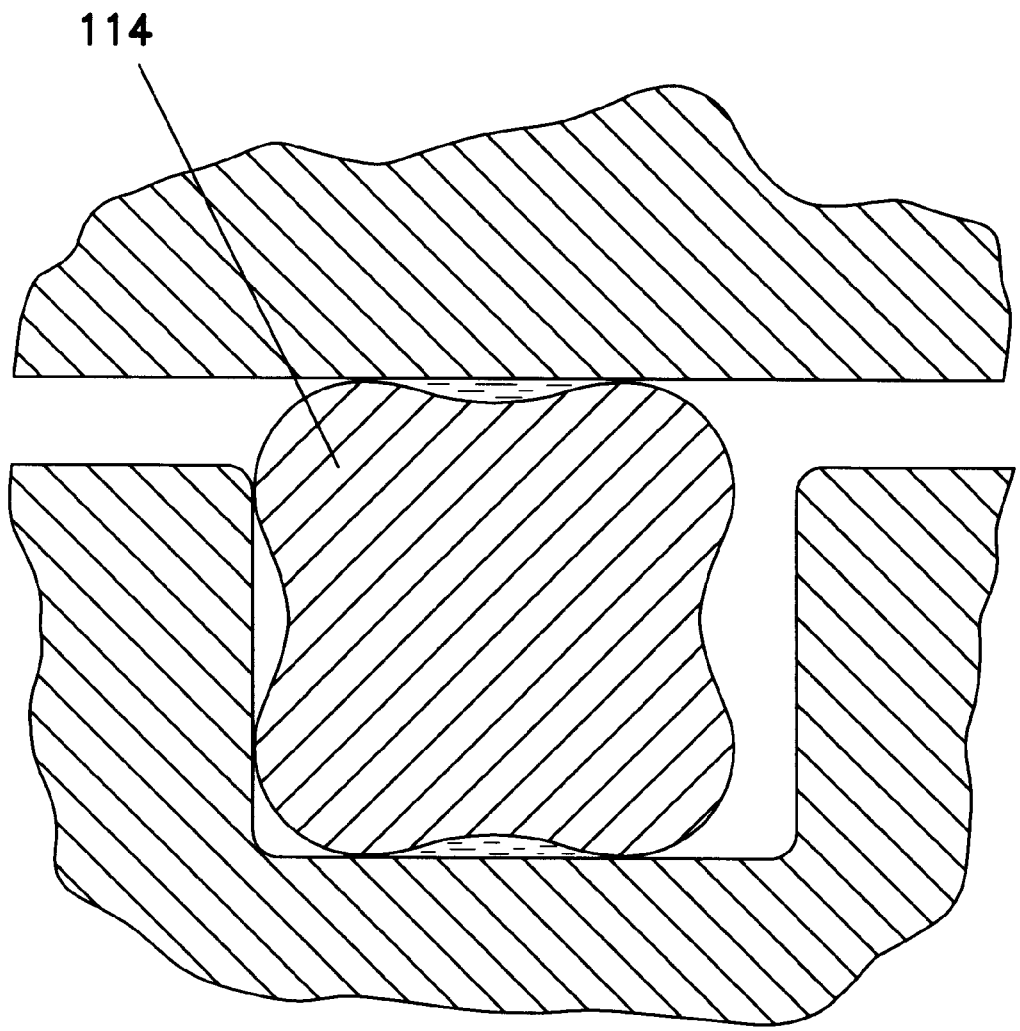
FIG. 31 is an enlarged partial cross-sectional view of a quad-ring which is disposed in the coupling valve assembly.

The fluid sealing members 114, 116 are resilient sealing members, such as a quad-ring, as generally shown in FIG. 31 in an enlarged view. It is appreciated that other types of sealing members, such as O-rings, U-cup seals, etc., can be used to address various design objectives such as friction, lubricant use, leakage, life, etc.

Further in FIG. 21, a hole 118 is disposed proximate the center of the front end portion 108 of the male coupling slide valve 102. The hole 118 equalizes the pressure between the front end 70 of the female coupling inner body 68 and the front end portion 108 of the male coupling slide valve 102 (see FIGS. 1 and 2) to outside the valve assembly 40 through the vent conduit 110.

Figure 26:
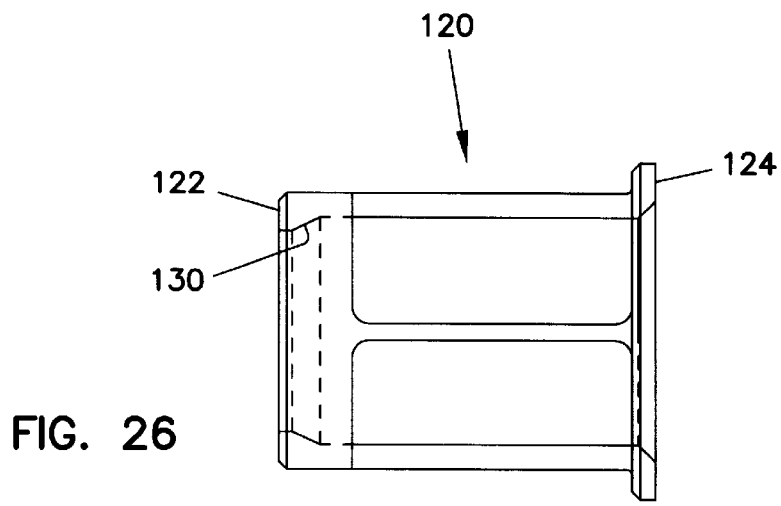
FIG. 26 is a side view of an insert seat of the male coupling.
Figure 27:
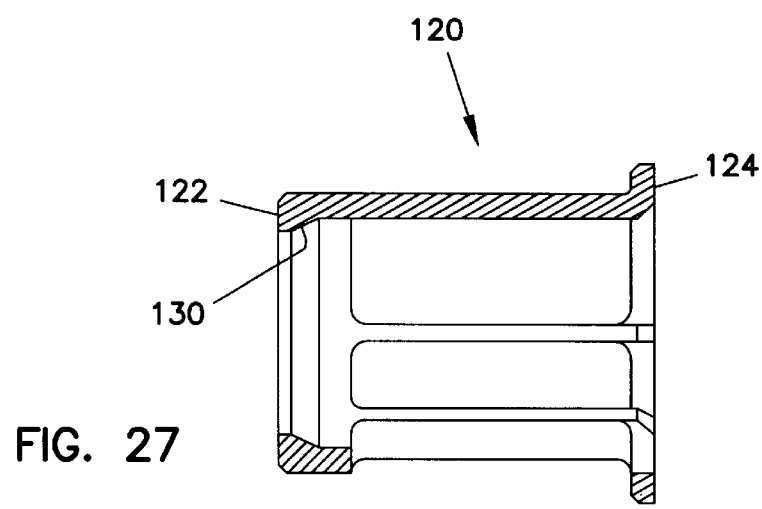
FIG. 27 is a longitudinal cross-sectional view of the insert seat of the male coupling.
Figure 28:
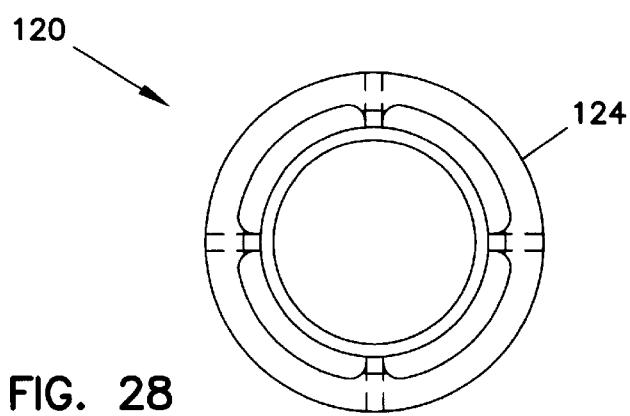
FIG. 28 is a back end view of the insert seat of the male coupling.

Further in FIGS. 1–3, the male coupling 42 further includes an insert seat 120. The insert seat 120 is retained in the male coupling outer body 88. The insert seat 120 is shown in FIGS. 26–28 in detail. The insert seat 120 has a front end 122 and a back end 124. The front end 122 of the insert seat 120 and the front end 90 of the outer body 88 form an internal sealing groove for receiving a sealing member. In FIGS. 1–3, a fluid sealing member 126 is retained between the front end 122 of the insert seat 120 and the front end 90 of the outer body 88. The fluid sealing member 126 seals between the front end outer side wall of the female coupling slide valve 78 and the front end inner side wall of the male coupling outer body. Thus, the fluid is stopped from moving to the rest of the cross-section of the female coupling slide valve. Further in FIGS. 1–3, the female coupling spring 80 is not exposed to the fluid passageway 74. A fluid sealing member 138 is retained in the outer wall of the female coupling inner body 68 proximate the middle of the female coupling inner body 68. The fluid sealing member 138 seals the gap between the outer wall of the female coupling inner body 68 and the inner wall of the female coupling slide valve 78. Thus, no fluid can flow into the inner body 68 of the female coupling 44. As a result, the female coupling slide valve 78 is pressure balanced in the internal fluid flow.

The fluid sealing member 126 is a resilient sealing member, such as a quad-ring as shown in FIG. 31. Other types of fluid sealing members, such as an O-ring, U-cups, etc. can replace the quad-ring to achieve various design objectives. Thus, the fluid spillage is minimized.

Still in FIG. 1, the male coupling slide valve 102 is biased to the front end 122 of the insert seat 120. A circumferential flange 128 (see FIGS. 20–21) which is disposed proximate the front end portion 108 of the slide valve is engaged with a circumferential shoulder 130 (see FIGS. 26–27) which is disposed proximate the front end 122 of the insert seat 120. The shoulder 130 of the insert seat 120 engages with the flange 128 to stop the male coupling slide valve 102 forward travel out of the male coupling 42 when the slide valve 102 is biased toward the front end 90 of the male coupling outer body 88 by the male coupling spring 104.

In FIGS. 1–3, a fluid passageway 132 is generally defined between the outer wall of the inner body 96, and the inner wall of the outer body 88. When the front end portion 108 of the male coupling slide valve 102 is engaged to the front end 90 of the male coupling outer body 88, the fluid sealing member seals the gap therebetween. Accordingly, the fluid passageway 132 is shut off, and no fluid can flow out of the front end 90 of the outer body 88. When the male coupling slide valve 102 is biased toward the back end 92 of the outer body 88, the front end portion 108 of the male coupling slide valve 102 is disengaged from the front end 90 of the male coupling outer body 88. Accordingly, the fluid passageway 132 is open as shown in FIG. 3.

As described above, the back end 100 of the inner body 96 has a conical shape. Thus, the fluid smoothly flows from the fluid passageway 132 to the fluid conduit adaptor 52.

In operation, the male coupling 42 is inserted into the female coupling 44 (shown from FIG. 1 to FIG. 2). The tapered front end 90 of the male coupling outer body 88 pushes the bottom part 65 of the vertical circular portion 64 of the clip assembly 60 out of the female coupling outer body 46. The front end 70 of the inner body 68 is received in the recessed portion 112 of the male coupling slide valve 102. At this time, the valve assembly 40 is at a pre-locking position (see FIG. 2), where the male coupling slide valve 102 is started to be pushed away from the front end 90 of the male coupling outer body 88. The male coupling spring 104 is started to be compressed. The flange 128 of the front end portion 108 of the male coupling slide valve 102 is started to be disengaged from the front end 90 of the outer body 88 and the fluid sealing member 126. The fluid passageway 132 is still shut off by the engagement between the fluid sealing member 126 and the front end portion 108 of the male coupling slide valve 102. Therefore, fluid spillage or leakage is minimized between the male coupling 42 and the female coupling 44 at the pre-locking position.

At the pre-locking position, the outer wall of the male coupling outer body 88 and the inner wall of the female coupling outer body 46 tightly fit with each other. In addition, the upwardly biased vertical circular portion 64 of the clip assembly 60 helps the male coupling 42 fit with the female coupling 44 at the pre-locking position. Further, the coupling halves are now pressure balanced, that is there is no effective pressure area exposed to create opposition force to continued operation of the valve assembly.

Further pushing the male coupling 42 into the female coupling 44, the female coupling inner body 68 is engaged with the male coupling slide valve 102 and pushes the male coupling slide valve 102 toward the back end 92 of the male coupling outer body 88. Meanwhile, the male coupling outer body 88 is engaged with the female coupling slide valve 78 and pushes the female coupling slide valve 78 toward the back end 50 of the female coupling outer body 46. Accordingly, in the male coupling 42, the front end portion 108 of the male coupling slide valve 102 is pushed away from the front end 90 of the male coupling outer body 88 and the fluid sealing member 126, so that the fluid passageway 132 is open to the female coupling 44. In the female coupling 44, the female coupling slide valve 78 is pushed away from the fluid port 76 so that the fluid passageway 74 is open to the male coupling 42. At this time, the coupling valve assembly 40 is in a locking position (see FIG. 3). The fluid passageway 74 and the fluid passageway 132 are in fluid communication.

In the locking position, the bottom part 65 of the vertical circular portion 64 of the clip assembly 60 is received and engaged in the circumferential recessed portion 94 of the male coupling outer body 88. Thus, the male coupling 42 and the female coupling 44 are locked together.

In the locking process, the male coupling spring 104 and the female coupling spring 80 are compressed. The internal pressure of the valve assembly 40 is balanced and the male slide valve is vented through the vent conduit 110 and the venting holes 89, 91. This pressure balance makes the locking process much easier and minimizes the increase in coupling force as a function of increasing fluid pressure.

To unlock the valve assembly 40, the top tab portion 62 of the clip assembly 40 is pushed downwardly where the spring 66 is compressed. Accordingly, the bottom part 65 of the vertical circular portion 64 of the clip assembly 60 is disengaged from the circumferential recessed portion 94 of the male coupling outer body 88. In the female coupling 44, the female coupling slide valve 78 is biased to the front end 48 of the female coupling outer body 46 by the female coupling spring 80. The fluid port 76 is then closed by the engagement of the female coupling slide valve 78 and the front end 70 of the female coupling inner body 68. Thus, the fluid passageway 74 is cut off. Meanwhile, in the male coupling 42, the male coupling slide valve 102 is biased to the front end 90 of the male coupling outer body 88 by the male coupling spring 104. The fluid passageway 132 is then shut off.

At this time, the valve assembly 40 is returned to the pre-locking position. The front end 70 of the female coupling inner body 68 is still engaged with the recessed portion 112 of the male coupling slide valve 102.

During the unlocking process, the fluid sealing members 114, 116, 126, the front end 70 of the coupling inner body 68, the female slide valve 78, and the front end portion 108 of the male slide valve 102 prevent the fluid from leaking or spilling out of the fluid passageways 74, 132 into the gap between the front end of 70 the female coupling outer body 68 and the front end 90 of the male coupling outer body 88.

Next, as shown in FIG. 1, the male coupling 42 and the female coupling 44 are separated from each other by pulling the male coupling 42 out of the female coupling 44. At this time, the male coupling slide valve 102 is further biased toward the front end 90 of the male coupling outer body 88 and is finally stopped by the engagement of the flange 128 of the male coupling slide valve 102 and the shoulder 130 of the insert seat 120.

In both the locking position and the pre-locking position, the male coupling 42 and the female coupling 44 are free to rotate relative to one another due to their tubular shapes as shown in the drawings.

Further, all the parts of the valve assembly 40, except the male coupling spring 104, the female coupling spring 80, and the spring 66 of the clip assembly 60, are made of plastic and/or elastomeric materials. It is appreciated that any other materials, such as metals, etc., can be also used.

It will be appreciated that alternate embodiments in keeping with the principles of the present invention might be utilized. It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts, within the principles of the invention, to the full extent indicated by the broad general meaning of the terms in which the appended claims are expressed.

What is claimed is:

1. A coupling valve assembly, comprising:
   a female coupling defining a female coupling fluid passageway therethrough, the female coupling including a female valve which is normally biased into a closed position by a female coupling spring so as to close the female coupling fluid passageway;
   a male coupling defining a male coupling fluid passageway therethrough, the male coupling including a male valve which is normally biased into a closed position by a male coupling spring so as to close the male coupling fluid passageway;
   a clip coupling/decoupling the male coupling and the female coupling so as to open/close the fluid passageways; and
   a plurality of seals defining fluid pressurized areas, each of the plurality of seals having a sealing diameter, three of the seals being disposed in the female coupling, and two of the plurality of seals being disposed in the male coupling, the sealing diameter of one of the seals in the female coupling being the same as the sealing diameter of one of the seals in the male coupling, the sealing diameter of the other two seals in the female coupling being the same as the sealing diameter of the other one seal in the male coupling, the seals being arranged and configured such that a fluid pressure balance within the male and female couplings in a coupled state is provided.

2. A coupling valve assembly according to claim 1, wherein the female coupling spring is isolated from the female coupling fluid passageway.

3. A coupling valve assembly according to claim 1, wherein the male coupling spring is isolated from the male coupling fluid passageway.

4. A coupling valve assembly according to claim 1, wherein the clip, the female coupling, and the male coupling are made of plastic such that fluid flowing in the fluid passageway is not exposed to metal.

5. A coupling valve assembly according to claim 1, further comprising a vent conduit passing through the male coupling to vent air pressure between inside of the coupling valve assembly and outside of the coupling valve assembly so that the air pressure between the outside and inside of the coupling valve assembly is equalized.

6. A coupling valve assembly according to claim 1, further comprising a female coupling fluid conduit adaptor, which is mounted on the female coupling, to connect the female coupling to a fluid line.

7. A coupling valve assembly according to claim 1, further comprising a male coupling fluid conduit adaptor, which is mounted on the male coupling, to connect the male coupling to a fluid line.

8. A coupling valve assembly, comprising:
   a female coupling defining a female coupling fluid passageway therethrough, the female coupling including a female valve which is normally biased into a closed position by a female coupling spring so as to close the female coupling fluid passageway;
   a male coupling defining a male coupling fluid passageway therethrough, the male coupling including a male valve which is normally biased into a closed position by a male coupling spring so as to close the male coupling fluid passageway;
   a clip coupling/decoupling the male coupling and the female coupling so as to open/close the fluid passageways; and
   a fluid pressure balance mechanism to reduce fluid pressurized areas on the male and female couplings, wherein the fluid pressure balance mechanism comprises:
      the female coupling including a first movable piston, in an uncoupled state, the first movable piston being sealed by a first seal having a first sealing diameter and a second seal having a second sealing diameter which is smaller than the first sealing diameter, an internal fluid pressure exerting a force on a first annular area of the first movable piston which is defined between the first and second sealing diameters;
      the male coupling including a second movable piston, in an uncoupled state, the second movable piston being sealed by a third seal having a third sealing diameter and a fourth seal having a fourth sealing diameter which is smaller than the third sealing diameter, an internal pressure exerting a force on a second annular area of the second movable piston which is defined between the third and fourth sealing diameters, and the first sealing diameter being the same as the third sealing diameter, the second sealing diameter being the same as the fourth sealing diameter; and
      wherein when the female and male couplings are coupled in the coupled state, the first movable piston is sealed by the first seal and the third seal such that the first movable piston is pressure balanced under an internal fluid pressure, and the second movable piston is sealed by a fifth seal and the fourth seal such that the second movable piston is pressure balanced under the internal fluid pressure, the fifth seal has the same sealing diameter as the second seal.

9. A coupling valve assembly according to claim 8, wherein the female coupling includes a fluid passageway and a spring biased against the first movable piston of the female coupling, the first movable piston is movable in the fluid passageway, the spring is isolated from the fluid passageway.

10. A coupling valve assembly according to claim 8, wherein the male coupling includes a fluid passageway and a spring biased against the second movable piston of the male coupling, the second movable piston is movable in the fluid passageway, the spring is isolated from the fluid passageway.

11. A coupling valve assembly according to claim 8, wherein each of the seals is a quad-ring.

* * * * *